No. 685,667. Patented Oct. 29, 1901.
C. W. BRADSHAW.
DITCH DIGGING MACHINE.
(Application filed Dec. 17, 1900.)
(No Model.) 3 Sheets—Sheet 1.
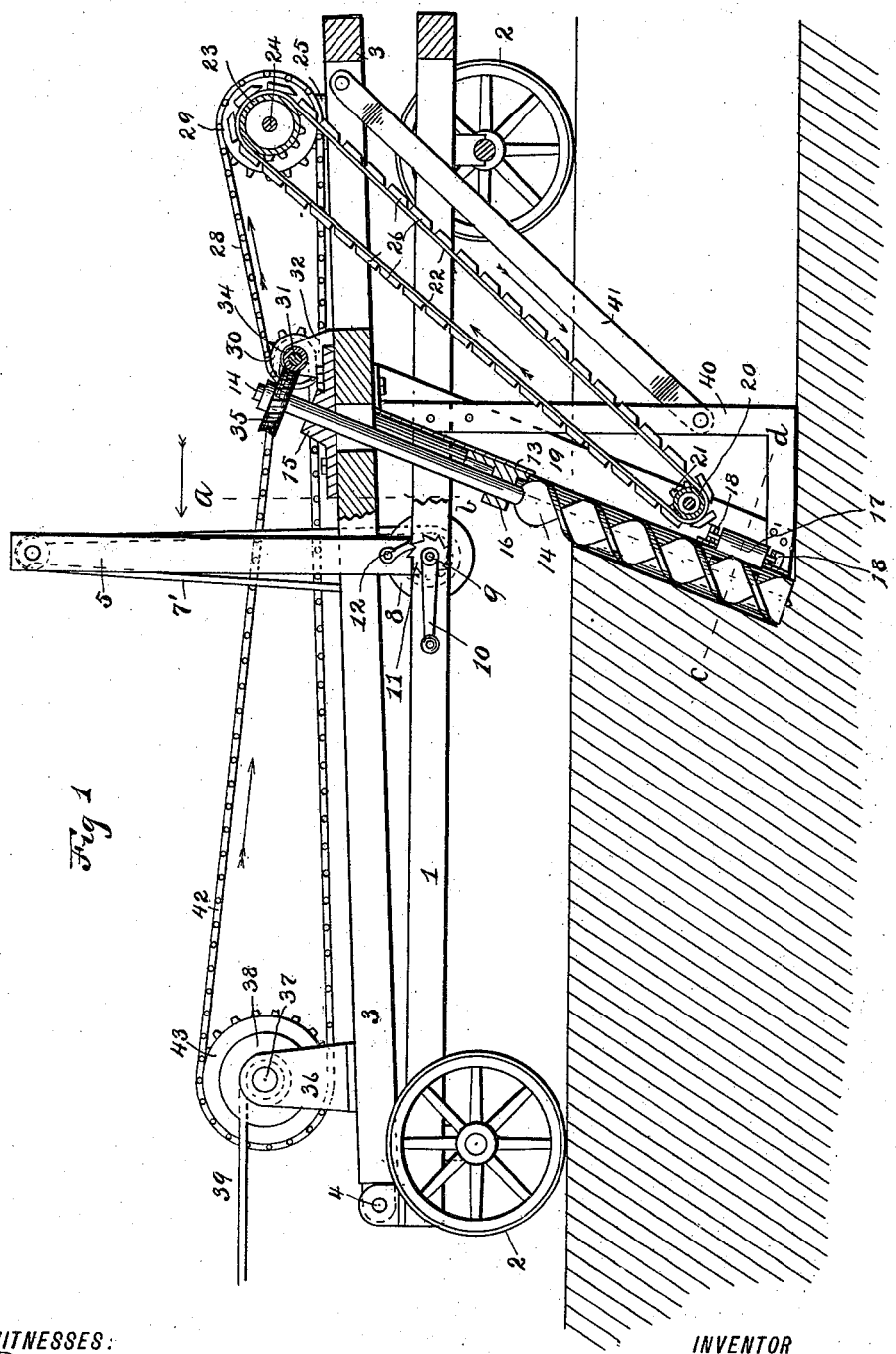
WITNESSES:
INVENTOR
Charles W. Bradshaw,
BY
Warren D. House,
His ATTORNEY.

No. 685,667. Patented Oct. 29, 1901.
C. W. BRADSHAW.
DITCH DIGGING MACHINE.
(Application filed Dec. 17, 1900.)
(No Model.) 3 Sheets—Sheet 2.
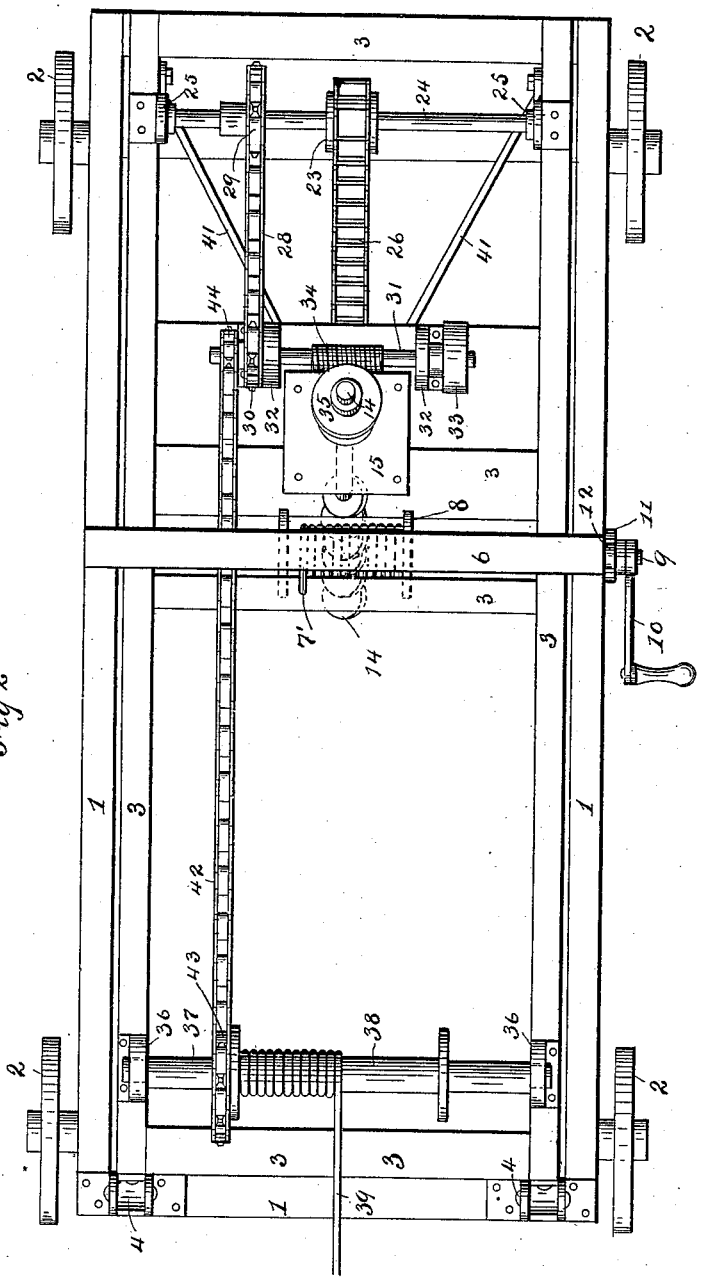
WITNESSES:
INVENTOR,
Charles W. Bradshaw,
BY
Warren D. House,
His ATTORNEY.

No. 685,667. Patented Oct. 29, 1901.
C. W. BRADSHAW.
DITCH DIGGING MACHINE.
(Application filed Dec. 17, 1900.)
(No Model.) 3 Sheets—Sheet 3.
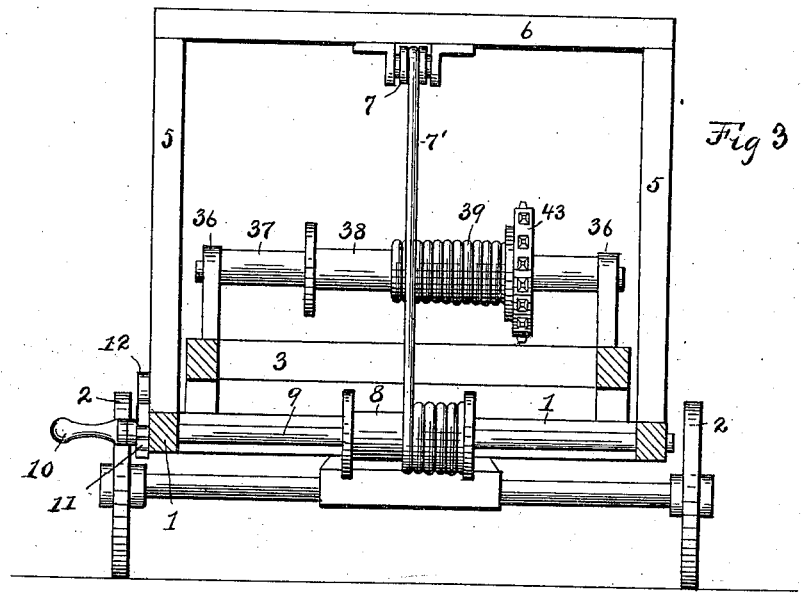
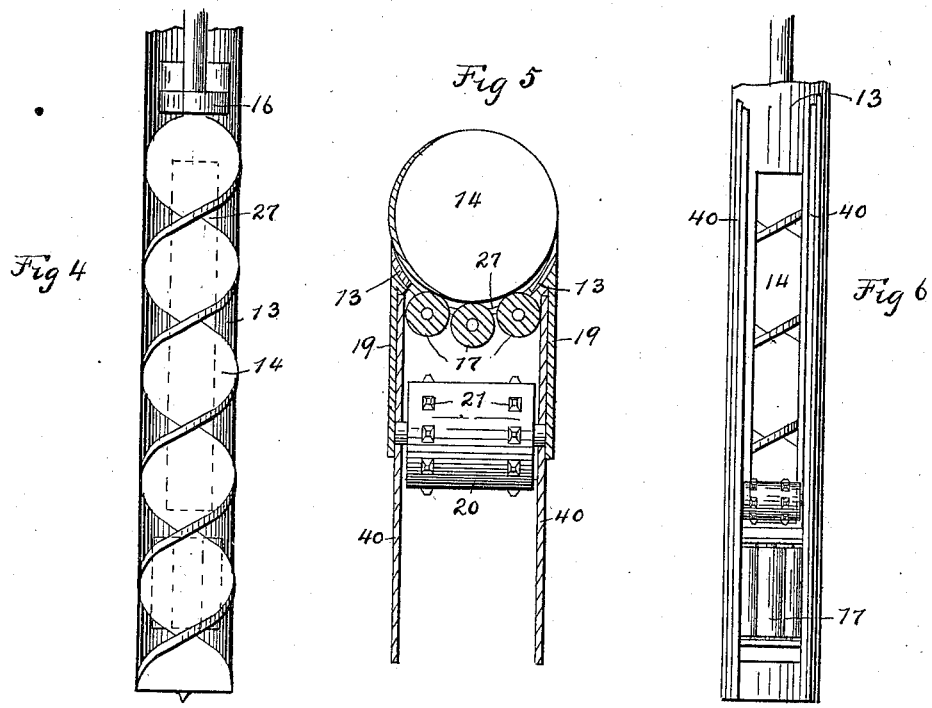
WITNESSES:
O. A. Corcoran
Edward L. Dimmith
INVENTOR
Charles W. Bradshaw,
BY
Warren D. House,
His ATTORNEY

UNITED STATES PATENT OFFICE.

CHARLES W. BRADSHAW, OF ARGENTINE, KANSAS.

DITCH-DIGGING MACHINE.

SPECIFICATION forming part of Letters Patent No. 685,667, dated October 29, 1901.

Application filed December 17, 1900. Serial No. 40,195. (No model.)

*To all whom it may concern:*

Be it known that I, CHARLES W. BRADSHAW, a citizen of the United States of America, residing in Argentine, in the county of Wyandotte and State of Kansas, have invented a new and useful Improvement in Ditch-Digging Machines, of which the following is a specification, reference being had therein to the accompanying drawings, forming a part thereof.

My invention relates to improvements in ditch-digging machines.

My invention provides a ditch-digging machine in which the excavating mechanism comprises a forwardly and downwardly inclined rotatable spiral blade the exterior edge of which is a cutting edge, means for rotating the spiral blade, and means by which the blade is moved at an angle to its axis of rotation simultaneously with its rotation.

My invention provides, further, an excavating mechanism comprising a support movable along the surface of the ground, a forwardly and downwardly inclined rotatable shaft carried thereby and provided with a peripheral cutting device, means for rotating the shaft, and means for simultaneously moving the support at an angle to the axis of the shaft.

My invention provides, further, an excavating mechanism comprising a support movable along the surface of the ground, a frame vertically movable thereon, a forwardly and downwardly inclined rotatable spiral blade carried thereby provided with an outer cutting edge, means for rotating the said blade, and means for simultaneously moving the support at an angle to the axis of rotation of the cutting-blade.

My invention provides, further, an excavating mechanism comprising a wheeled support, a frame pivotally mounted thereon, a forwardly and downwardly inclined rotatable shaft carried by the frame and provided with a peripheral cutting device, means for swinging the frame upon its pivotal support, means for rotating the shaft, and means for simultaneously moving the wheeled support at an angle to the axis of the shaft.

My invention provides, further, a forwardly and downwardly inclined spiral cutting-blade, a sheath embracing the rear side thereof to receive the excavated material, means for carrying away the excavated material discharged from the sheath, means for rotating the spiral blade, and means for moving the blade and sheath at an angle to the axis of rotation of the spiral blade.

My invention provides, further, a forwardly and downwardly inclined spiral cutting-blade, a sheath embracing the rear side thereof and discharging into a series of buckets mounted upon a belt, means for driving the belt, and means for rotating the spiral blade and simultaneously moving it and the sheath at an angle to its axis of rotation.

My invention provides, further, a forwardly and downwardly inclined shaft provided with a peripheral cutting device, a sheath embracing the rear side thereof, a bearing for the upper end of the shaft, one or more rollers providing a bearing for the rear side of the lower end of the shaft, and means for rotating the shaft and simultaneously moving it and the sheath at an angle to the axis of the shaft.

My invention provides, further, a spiral blade provided with an exterior cutting edge, means for simultaneously rotating the blade and moving it at an angle to its axis of rotation, and a landside providing a rear support for the blade and resting upon the bottom of the ditch excavated by the blade.

My invention provides, further, a wheeled support, a drum carried thereby, means for rotating the drum, a rope adapted to be wound thereon and to be secured at its outer end to a fixed abutment, whereby the support will be moved along the surface of the ground when the drum is revolved in the proper direction, a spiral blade provided with an outer cutting edge and carried by the support in a position disposed at an angle to the plane of movement of the support, and means for rotating the spiral blade simultaneously with the rotation of the drum.

My invention provides, further, certain novel features of construction hereinafter fully described and claimed.

In the accompanying drawings, illustrative of my invention, Figure 1 represents a side elevation of a machine constructed in accordance with the principles of my invention, portions of the mechanism being shown in vertical section. Fig. 2 represents a plan view of the machine. Fig. 3 represents a vertical transverse sectional view taken on the dotted line a b of Fig. 1. Fig. 4 represents a front elevation view of the spiral cutting-blade and a portion of the conveying-sheath. Fig. 5 represents a transverse sectional view taken on the dotted line c d of Fig. 1. Fig. 6 represents a rear elevation of the parts shown in Fig. 4.

Similar numerals of reference indicate similar parts.

1 indicates a horizontal supporting-frame provided with four carrying-wheels 2, adapted to travel upon the surface of the ground.

3 indicates a vertically-adjustable frame mounted in any desirable manner upon the support 1, but preferably pivoted thereto at the forward end, as indicated by 4. Any desirable means of swinging the frame 3 may be adopted. I have shown in the drawings a suitable mechanism for this purpose comprising two vertical posts 5, supported by the support 1 and connected at their upper ends by a horizontal beam 6, on which is rotatably mounted a sheave 7, over which passes a rope 7', one end of which is secured to the frame 3 and the other end is wound on a drum 8, rotatable with a horizontal shaft 9, having bearings in the support 1 and provided at one end with a crank 10, by means of which the shaft 9 and drum 8 are rotated. Upon the shaft 9 is secured a ratchet-wheel 11, in the teeth of which operates a pawl 12, which is pivotally mounted on the support 1. By rotating the crank 10 in the proper direction the frame 3 may be vertically adjusted or swung on its pivotal supports.

Secured at its upper end to the frame 3 is an inclined conveying-sheath 13, the forward concave side of which embraces the rear side of a downwardly and forwardly inclined spiral shaft 14, similar in shape to an auger, the outer edges of the spiral threads being cutting edges. The spiral shaft is rotatably mounted in the bearing 15, mounted on the frame 3, and the bearing 16, secured to the front side of the sheath 13. The rear side of the lower end of the shaft 14 has a bearing upon one or more rollers 17, disposed parallel to the axis of the shaft 14 and mounted in bearings 18, secured to the rear side of the sheath 13, in which are provided openings through which the peripheries of the rollers extend. Upon each side of the rear side of the sheath 13 is secured a vertical brace-plate 19. Between these two brace-plates, just above the rollers 17, is rotatably mounted a horizontal belt-wheel 20, provided with peripheral teeth 21 for engaging a belt 22, which embraces the belt-wheel 20, and a similar belt-wheel 23, mounted upon and rotatable with a horizontal shaft 24, which is mounted in bearings 25 upon the upper side of the frame 3 and to the rear of the shaft 14. The wheel 23 is provided with peripheral teeth similar in form and purpose to those on the wheel 20. Disposed upon the outside of the belt 22 and secured thereto are a series of buckets 26, which pass adjacent to a slot 27 in the rear side of the sheath 13 and receive the material excavated by the spiral cutting-shaft 14, conveying it above the frame 3, where it is discharged and disposed of in any manner desired. The belt 22 is driven by means of a sprocket-chain 28, which embraces a sprocket-wheel 29, secured upon the shaft 24, and a sprocket-wheel 30, secured upon a horizontal driving-shaft 31, rotatably mounted in bearings 32 upon the frame 3. The driving-shaft 31 is rotated in any desirable manner, as by a gasolene or steam engine or an electric motor that may be carried upon the frame 3 and be connected directly to the shaft or connected therewith through the intermediacy of a pulley 33, secured upon the shaft. As the different motive powers that may be employed to drive the shaft 31 and the manner of coupling them to the shaft are well known, it is thought unnecessary to illustrate the same. Upon the shaft 31 is secured a worm 34, which engages a worm-wheel 35, secured upon the shaft 14.

Upon the forward part of the machine—as, for instance, upon the frame 3—are provided two bearings 36, in which is mounted a rotatable horizontal shaft 37, disposed transversely to the frame and having mounted upon it and rotatable therewith a drum 38, upon which is secured one end of a rope 39, the forward end of which it is intended to secure to a stationary abutment or post (not shown) in front of the machine. It will be understood that by rotating the drum 38 the rope will be wound thereon and the machine will be drawn forward, carrying with it the inclined spiral cutting blade or shaft 14.

Forming a rear support or brace for the spiral shaft 14 and the sheath is a landside which performs a function to the same device in a plow. This landside is preferably in the form of two vertical plates 40, disposed parallel with each other and secured at their upper ends to the two brace-plates 19 and having their lower ends extending forwardly at right angles and secured to the lower ends of the brace-plates 19. The lower edges of the plates forming the landside are on the same horizontal plane as the lower end of the spiral shaft 14 and slide along on the bottom of the ditch. Secured at their lower ends to the plates 40 are two upwardly and rearwardly inclined brace-bars 41, the upper ends of which are secured to the frame 3.

In operating my invention a hole is first dug in the ground where it is desired to have the ditch. The machine is then placed with its forward end in line with where it is intended to run the ditch and the rope 39 secured at its forward end to a stationary post or abutment located in a line forming a prolongation of the center line of the ditch. The pawl 12 is then disengaged from the ratchet 11 and the shaft 9 rotated by the crank 10 in a direction such that the rope will be given off the drum 8, thus permitting the frame 3 to swing downwardly until the landside and lower end of the spiral shaft rest upon the bottom of the hole, which is on the same plane as it is desired to have the bottom of the ditch. The driving-shaft is then rotated by whatever means has been selected for this purpose, thus rotating the spiral shaft 14 through the intermediacy of the worm 34 and the wheel 35. At the same time the drum 38 is rotated in the proper direction to wind thereon the rope 39 by means of a sprocket-chain 42, which embraces a sprocket-wheel 43 on the shaft 37 and a sprocket-wheel 44 on the driving-shaft. As the rope 39 winds on the drum 38 the machine will be drawn gradually forward simultaneously with the rotation of the spiral cutting-shaft 14. The forward movement of the machine will force the rotating shaft against the earth in front of it, and the cutting edges of the thread or threads on the shaft will cut the dirt, forcing it upwardly and rearwardly until it is forced through the slot 27 and into the buckets 26 on the belt 22. The dirt is thus carried to the upper part of the machine and out of the ditch, where it can be disposed of as it may be desired. The landside prevents the spiral shaft from drawing downward. The forward and downward inclination of the spiral cutting-shaft 14 serves a double function in the operation of the machine. It tends when rotated to hold the machine down and also to draw it forward, thus facilitating the excavating operation. Another function performed by giving the cutting-shaft the inclined position is to form the ditch arcuate at the bottom, thus making it conform to the shape of the piping that is afterward laid in the ditch, and also thus providing means by which the piping is alined in the center of the ditch, as the piping will roll to the center, which is the lowest part of the ditch. The speed forward of the machine and the rotation of the shaft can be properly adjusted relatively by employing the gearing suitable for the speed best adapted for the depth of ditch and the quality of soil that is operated upon. When the ditch is completed, the shaft 14 and connected parts may be elevated above the surface of the ground by rotating the crank 10 in a direction opposite to the direction it is turned for lowering the frame 3. The stationary abutment to which the rope 39 is secured can be changed or moved ahead as the work progresses.

It is obvious that many modifications in the construction of the machine may be made without departing from the spirit of my invention.

Having thus described my invention, what I claim, and desire to secure by Letters Patent, is—

1. In a ditch-digging machine, the combination with a forwardly and downwardly inclined shaft provided with a spiral cutting-blade, of means for rotating the shaft and moving it at an angle to its axis, a conveying-sheath embracing the rear side of the shaft and provided with a discharge-opening in its rear side, a series of buckets arranged so as to pass consecutively adjacent to the said opening, and means for so passing the buckets, substantially as described.

2. In a ditch-digging machine, the combination with a spiral cutting-blade, of means for rotating the same, means for moving the blade at an angle to its axis of rotation, a conveying-sheath embracing the rear side of the spiral blade and movable therewith, and a landside supporting the rear side of the said sheath, substantially as described.

3. In a ditch-digging machine, the combination with a support, of a forwardly and downwardly inclined rotatable spiral cutting-blade carried thereby, a sheath embracing the rear side of the blade for conveying the excavated material from the spiral blade, a belt provided with a series of buckets carried by the said support and disposed so as to receive the excavated material from the sheath, means for elevating and lowering the spiral blade, the sheath and the belt upon the support, means for driving the belt, means for rotating the spiral blade, and means for moving the support at an angle to the axis of rotation of the blade simultaneously with the rotation of the blade, substantially as described.

4. In a ditch-digging machine, the combination with a support, of a frame vertically adjustable thereon, a spiral cutting-blade carried by the frame, a conveying-sheath embracing the rear side of the spiral blade, a landside carried by the frame and supporting the spiral blade at its rear, a belt provided with a series of buckets so disposed as to receive the material discharged from the sheath, means for driving the belt, means for rotating the spiral blade, and means for simultaneously moving the support at an angle to the axis of rotation of the blade, substantially as described.

5. In a ditch-digging machine, an excavating mechanism comprising a forwardly and downwardly inclined spiral blade provided along its exterior with a cutting edge, a grooved conveying-sheath embracing the rear side thereof, a bearing for the upper end of the spiral blade, and one or more rollers suitably mounted and providing a bearing for the rear side of the lower end of the blade, substantially as described.

6. In a ditch-digging machine, the combination with a shaft provided with a peripheral cutting device, of means for rotating the shaft, means for moving the same at an angle to its axis, and a landside to the rear of and supporting the shaft, substantially as described.

7. In a ditch-digging machine, the combination with a shaft forwardly and downwardly inclined and provided with a peripheral cutting device, of means for rotating the shaft, means for moving the same forward, and a landside to the rear of and supporting the shaft, substantially as described.

8. In a ditch-digging machine, the combination with a shaft provided with a peripheral cutting device, of means for rotating the shaft, means for moving the same at an angle to its axis, means for vertically adjusting the shaft, and a landside to the rear of and supporting the shaft, substantially as described.

9. In a ditch-digging machine, the combination with a shaft provided with a peripheral cutting device, of means for rotating the shaft, means for moving the shaft at an angle to its axis, a landside to the rear of and supporting the shaft, and means for removing the material excavated by the cutting device, substantially as described.

10. In a ditch-digging machine, the combination with a shaft provided with a peripheral cutting device, of means for rotating the shaft, means for moving the shaft at an angle to its axis, a landside to the rear of and supporting the shaft, a series of buckets for removing the material excavated by the cutting device, and means for bringing the buckets adjacent to and away from the cutting device, substantially as described.

11. In a ditch-digging machine, the combination with a shaft provided with a peripheral cutting device, of means for rotating the shaft, means for moving the shaft at an angle to its axis, means for vertically adjusting the shaft, a landside to the rear of and supporting the shaft, and means for conveying from the cutting device the material excavated thereby, substantially as described.

12. In a ditch-digging machine, the combination with a shaft provided with a peripheral cutting device, of means for rotating the shaft, means for moving the shaft at an angle to its axis, a landside to the rear of and supporting the shaft, a series of buckets for removing the material excavated by the cutting device, a belt on which the buckets are mounted, and means for driving the belt, substantially as described.

13. In a ditch-digging machine, the combination with a shaft provided with a peripheral cutting device, of means for rotating the shaft, means for moving the shaft at an angle to its axis, a landside to the rear of and supporting the shaft, a series of buckets for carrying away material, means for bringing the buckets adjacent to and away from the cutting device, and means for vertically adjusting the shaft and landside, substantially as described.

14. In a ditch-digging machine, the combination with a horizontally-movable supporting-frame, of a shaft rotatably mounted on the said support and provided with a peripheral cutting device, of means for rotating the shaft, means for moving the supporting-frame at an angle to the axis of the shaft, and a landside carried by the supporting-frame and in turn supporting the shaft in the rear thereof, substantially as described.

In testimony whereof I have signed my name to this specification in the presence of two subscribing witnesses.

CHARLES W. BRADSHAW.

Witnesses:
C. L. FUNK,
W. R. NELSON.